(12) United States Patent
Ejima (10) Patent No.: US 11,283,099 B2
(45) Date of Patent: Mar. 22, 2022

(54) BATTERY PACK

(71) Applicant: Panasonic Intellectual Property Management Co., Ltd., Osaka (JP)

(72) Inventor: Tsuneyuki Ejima, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 57 days.

(21) Appl. No.: 16/214,418

(22) Filed: Dec. 10, 2018

(65) Prior Publication Data
US 2019/0181488 A1    Jun. 13, 2019

(30) Foreign Application Priority Data

Dec. 13, 2017    (JP) .............................. JP2017-238850

(51) Int. Cl.
*H01M 10/04* (2006.01)
*H01M 50/20* (2021.01)
*H01M 50/40* (2021.01)

(52) U.S. Cl.
CPC ....... *H01M 10/0481* (2013.01); *H01M 50/20* (2021.01); *H01M 50/40* (2021.01)

(58) Field of Classification Search
CPC ... H01M 10/0481; H01M 50/20; H01M 50/40
See application file for complete search history.

(56) References Cited

U.S. PATENT DOCUMENTS

2011/0076546 A1    3/2011    Choi et al.
2012/0263995 A1    10/2012    Naito et al.
(Continued)

FOREIGN PATENT DOCUMENTS

| CN | 101983443 | 3/2011 |
|---|---|---|
| CN | 102696131 | 9/2012 |

(Continued)

OTHER PUBLICATIONS

Chinese Office Action including Chinese Search Report dated Apr. 30, 2021 in corresponding Chinese Application No. 201811507035.9 with partial translation of Office Action and English translation of Search Report.

(Continued)

*Primary Examiner* — Milton I Cano
*Assistant Examiner* — Jenna Shulman
(74) *Attorney, Agent, or Firm* — Wenderoth, Lind & Ponack, L.L.P.

(57) ABSTRACT

A battery pack includes: a plurality of battery cells arranged in a line in one arrangement direction; a pair of end plates disposed at opposite ends of the plurality of battery cells in the arrangement direction; a pair of binding bars disposed on opposite sides of the plurality of battery cells in a direction perpendicular to the arrangement direction; and an insulator disposed in a gap between each of the binding bars and the battery cells. The insulator having an initial thickness larger than a thickness of the gap before insertion of the insulator into the gap in a compressed state. The end plates sandwich the battery cells therebetween in the arrangement direction, and the binding bars sandwich the battery cells therebetween in the direction perpendicular to the arrangement direction.

8 Claims, 7 Drawing Sheets

(56) References Cited

U.S. PATENT DOCUMENTS

| | | | |
|---|---|---|---|
| 2015/0144409 A1* | 5/2015 | Fujii | B60L 3/0046 180/65.1 |
| 2016/0222631 A1 | 8/2016 | Kohno et al. | |
| 2017/0358785 A1 | 12/2017 | Hattori et al. | |
| 2018/0138560 A1* | 5/2018 | Bessho | H01M 10/6557 |
| 2020/0243816 A1* | 7/2020 | Terauchi | H01M 50/20 |

FOREIGN PATENT DOCUMENTS

| | | |
|---|---|---|
| EP | 3 096 377 | 11/2016 |
| JP | 2015-141887 | 8/2015 |
| JP | 2016-213104 | 12/2016 |
| WO | 2014/034106 | 3/2014 |
| WO | 2016/136248 | 9/2016 |

OTHER PUBLICATIONS

Notice of Reasons for Refusal dated Jul. 6, 2021 in related Japanese Patent Application No. 2020-134083, with English Translation.

* cited by examiner

BATTERY PACK

CROSS-REFERENCE TO RELATED APPLICATIONS

This application claims priority of Japanese Patent Application No. 2017-238850 filed on Dec. 13, 2017, the contents of which are incorporated herein by reference.

BACKGROUND OF THE INVENTION

(1) Field of the Invention

The present disclosure relates to a battery pack in which a plurality of battery cells are arranged in one direction as an arrangement direction.

(2) Description of the Related Art

In conventional battery packs, a battery pack in which a plurality of battery cells are arranged in series and when electrode terminals at both ends of adjacent battery cells are connected with a collector referred to as a bus bar, a known method of welding electrode terminals and the bus bar together by a laser is used (see, for example, WO 2014/034106).

Figure 6:
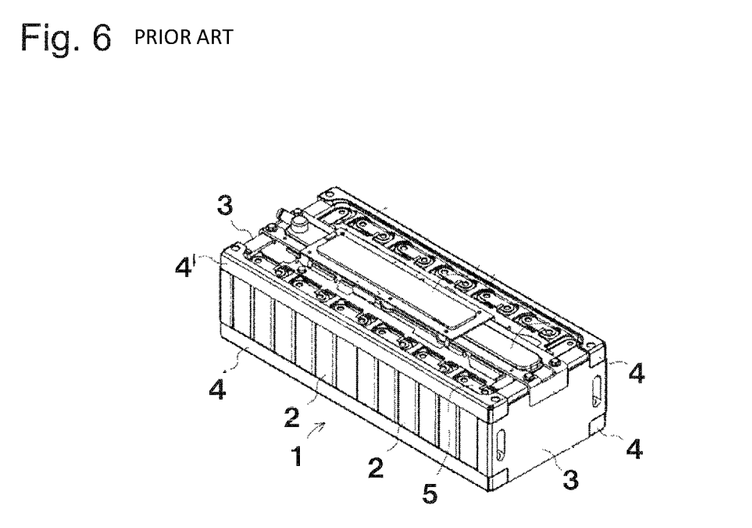
FIG. 6 is a schematic perspective view showing the overall configuration of a conventional battery pack described in WO 2014/034106.

FIG. 6 is a schematic perspective view showing the entire structure of a conventional battery pack described in the above WO 2014/034106. FIG. 6 shows an overall view of a conventional battery pack. In the drawing, the battery pack 1 has a structure of coupling and fixing end plates 3 with a binding bar 4 extending along the arrangement direction in a state where a plurality of battery cells 2 are arranged in series and both ends of the arranged battery cells 2 are sandwiched by the end plates 3. In addition, an electrode terminal is provided on the upper surface of the battery cell 2, and one electrode terminal of adjacent battery cells 2 is joined with a bus bar 5.

Figure 2A:
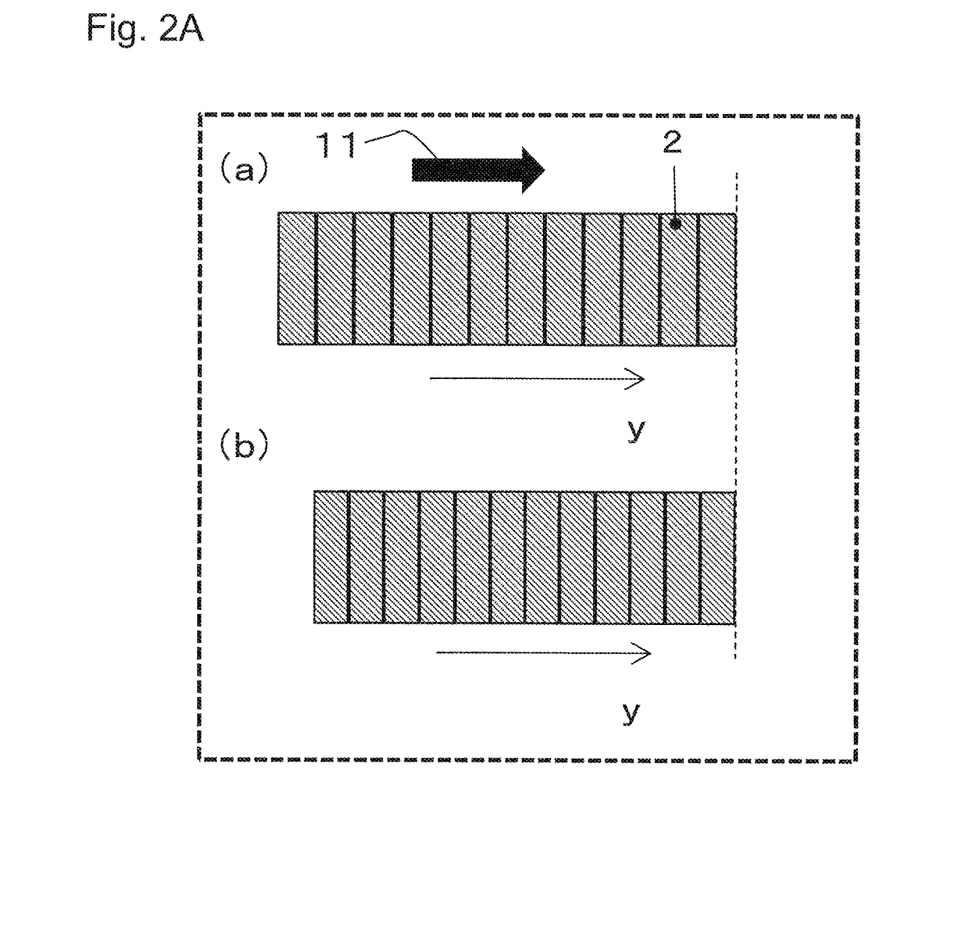
FIG. 2A shows a diagram (a) showing the movement of members when the battery pack in the first embodiment of the present disclosure receives an impact in the arrangement direction, and a schematic view (b) showing a state in which each battery cell is compressed in the arrangement direction by the impact in the arrangement direction in the diagram (a)

In recent years, as represented by the battery pack in WO 2014/034106, welding by a laser or the like is increasingly used for joining the electrode terminal of the lithium ion secondary battery and the bus bar. As a method of joining the electrode terminals of the battery pack before this, a method in which the electrode terminal has a screw structure and the bus bar is bolted and joined has been used, but joining using laser welding has an advantage that the number of steps is reduced as compared with screw fastening. On the other hand, laser welding has a disadvantage that the strength of the joint portion is weaker than that of bolt fastening. For example, when a load due to an impact or vibration is applied to the battery pack, a load is generated in the bus bar welding portion due to the displacement of the battery cell constituting the battery pack. Furthermore, if the load becomes too large, the welding portion may break. In particular, when a large impact is applied to the direction in which the battery cells are arranged in series (hereinafter referred to as the arrangement direction, referred to as the y direction), as shown in FIG. 2A, the battery cells having no constraint other than the end plate in this arrangement direction are largely displaced. As a result, a large load is also generated in the welding portion, which is most dangerous.

SUMMARY OF THE INVENTION

One non-limiting and exemplary embodiment provides a battery pack in which breaking in a joint portion between a bus bar and an electrode is prevented.

The battery pack includes:
a plurality of battery cells in a line arranged in one direction as an arrangement direction;
a pair of end plates configured to sandwich the plurality of battery cells in the line from both ends in the arrangement direction of the plurality of battery cells;
a pair of binding bars configured to sandwich the plurality of battery cells from a direction perpendicular to the arrangement direction and to fasten the pair of end plates at both ends in the arrangement direction; and
an insulator sandwiched in a gap between each of the binding bars and the battery. The insulator has an initial thickness larger than a thickness of the gap before insertion into the gap in a compressed state.

As described above, the battery pack according to the present disclosure includes an insulator such as rubber or a resin sandwiched in a gap between a binding bar and a battery cell. Thus, even when a large external force is applied to a plurality of battery cells in the arrangement direction, friction with an insulator such as rubber or a resin sandwiched between the binding bar and the battery cell can reduce cell displacement in the direction of the external force and prevent breakage at the joint portion between the bus bar and the electrode. Furthermore, this insulator, which has an initial thickness larger than a thickness of the gap before insertion into the gap, is in a compressed state. Thus, the above effect can be achieved without substantially changing the external dimensions of the battery pack.

Additional benefits and advantages of the disclosed embodiments will be apparent from the drawing figures and the following detail description. The benefits and/or advantages may be individually provided by the various embodiments and features thereof, and need not all be provided in order to obtain one or more of the same.

BRIEF DESCRIPTION OF THE DRAWINGS

The present disclosure will become readily understood from the following description of non-limiting and exemplary embodiments thereof made with reference to the accompanying drawings, in which like parts are designated by like reference numerals and in which.

DETAILED DESCRIPTION OF PREFERRED EMBODIMENTS

A battery pack according to a first embodiment of the invention includes:

a plurality of battery cells in a line arranged in one direction as an arrangement direction;

a pair of end plates configured to sandwich the plurality of battery cells in the line from both ends in the arrangement direction of the plurality of battery cells;

a pair of binding bars configured to sandwich the plurality of battery cells from a direction perpendicular to the arrangement direction and to fasten the pair of end plates at both ends in the arrangement direction; and an insulator sandwiched in a gap between each of the binding bars and the battery cells. The insulator has an initial thickness larger than a thickness of the gap before insertion into the gap.

Further, assuming that a friction coefficient between the battery cells and a corresponding one of the binding bars, and the insulator is $\mu$, and a compressibility ratio of the insulator is $\Delta L$, a following relationship is satisfied,
if $0.2 < \mu < 0.4$, then $\Delta L > 13\mu^2 - 11.55\mu + 2.63$, and
if $0.4 \leq \mu$, then $\Delta L > 0.125\mu^2 - 0.275\mu + 0.18$.

Further, the insulator is adhered to at least one of a corresponding one of the binding bars and the battery cells.

Further, when a mounting surface of an electrode of the battery cells is set to be an upper side, the initial thickness of the insulator becomes larger toward the upper side.

Hereinafter, a battery pack according to an embodiment of the present disclosure will be described with reference to the accompanying drawings. It should be noted that in the drawings, substantially the same members are denoted by the same reference numerals.

First Embodiment

Figure 1A:
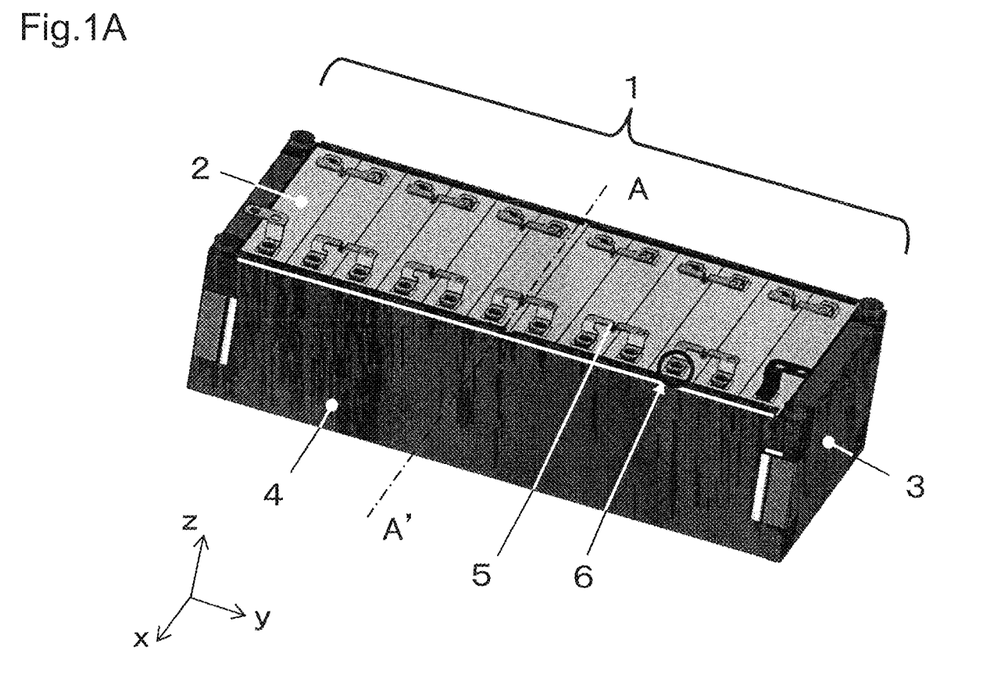
FIG. 1A is a schematic perspective view showing an overall configuration of a battery pack according to a first embodiment of the present disclosure.
Figure 1B:
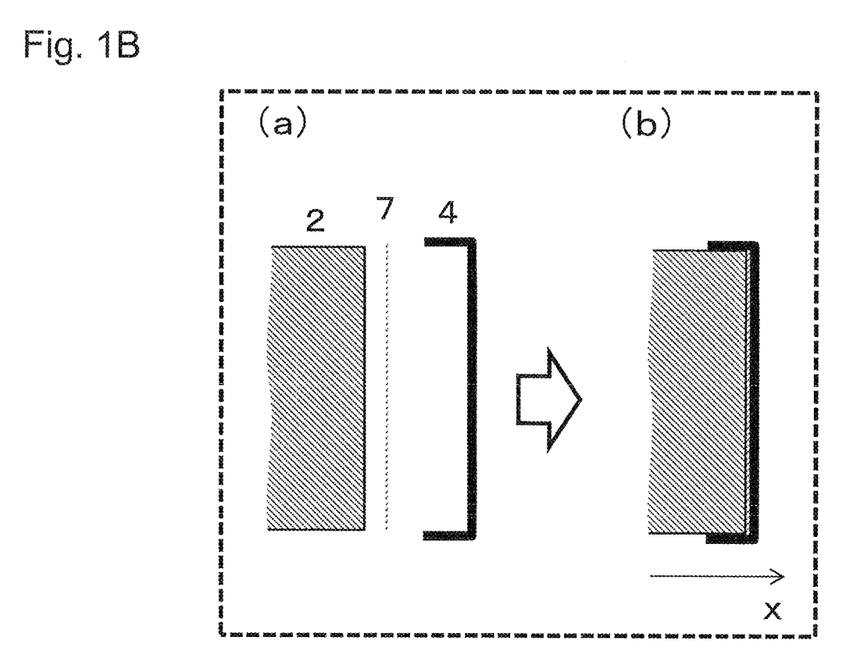
FIG. 1B shows an exploded view (a) showing a configuration of a battery cell, a thin insulator, and a binding bar between a battery cell and an end plate at one end of the battery pack in FIG. 1A, and a schematic cross-sectional view (b) showing only the battery cell, the binding bar, and the insulator in the exposed view (a) out of the cross section of the battery pack perpendicular to the arrangement direction (y direction) taken along the dotted line A-A' of the battery pack in FIG. 1A.
Figure 1C:
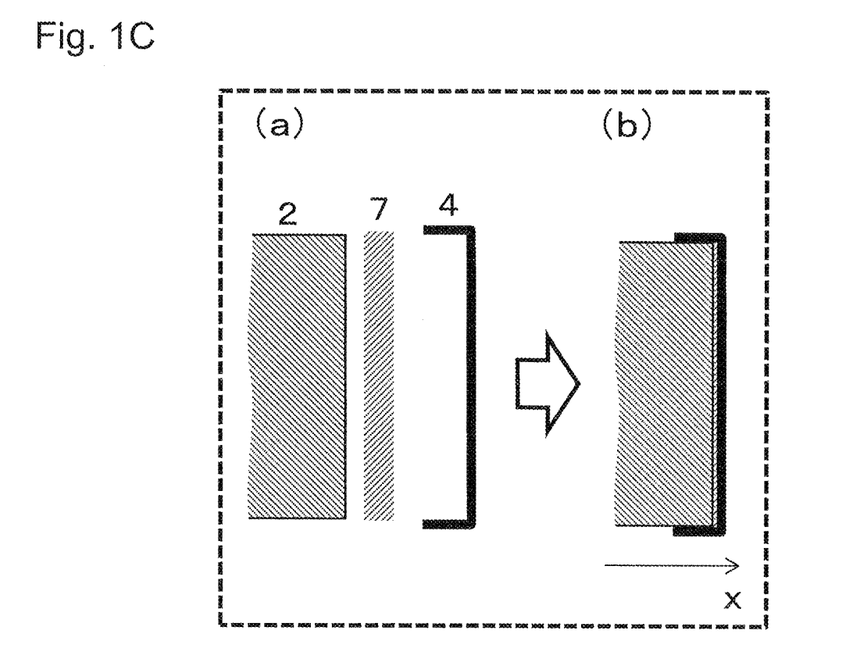
FIG. 1C shows an exploded view (a) showing a configuration of a battery cell, a thick insulator, and a binding bar between a battery cell and an end plate at one end of the battery pack in FIG. 1A, and a schematic cross-sectional view (b) showing only the battery cell, the binding bar, and the insulator in the exposed view (a) out of the cross section of the battery pack perpendicular to the arrangement direction (y direction) taken along the dotted line A-A' of the battery pack in FIG. 1A.

FIG. 1A is a perspective view showing the whole battery pack 1 according to a first embodiment of the present disclosure. FIG. 1B (a) is an exploded view showing a configuration of a battery cell 2, a thin insulator 7, and a binding bar 4 between the battery cell 2 and the end plate 3 at one end of the battery pack 1 in FIG. 1A. FIG. 1B (b) is a schematic cross-sectional view showing only the battery cell 2, the binding bar 4, and the insulator 7 in FIG. 1B (a) out of a cross section of the battery pack 1 taken along the dotted line A-A' in FIG. 1A. The cross section is perpendicular to the arrangement direction (y direction). FIG. 1C (a) is an exploded view showing a configuration of a battery cell 2, a thick insulator 7, and a binding bar 4 between the battery cell 2 and the end plate 3 at one end of the battery pack 1 in FIG. 1A. FIG. 1C (b) is a schematic cross-sectional view showing only the battery cell 2, the binding bar 4, and the insulator 7 in FIG. 1C (a) out of a cross section of the battery pack 1 taken along the dotted line A-A' of the battery pack 1 in FIG. 1A. The cross section is perpendicular to the arrangement direction (y direction).

In FIG. 1A, the same reference numerals are used for the same components as those in FIG. 6. The battery pack 1 according to the first embodiment includes a plurality of battery cells 2, end plates 3, binding bars 4, and insulators. The battery cell 2 is a basic component of a storage battery, which stores electricity generated by a power generation device and supplies electricity to a connected electric apparatus or a device as necessary. The plurality of battery cells 2 are arranged in series. Each one of the end plates 3 is arranged at either end of a plurality of battery cells 2 and in contact with a corresponding battery cell at the either end, whereby the end plates 3 sandwich the plurality of battery cells 2 from both ends in the arrangement direction. The binding bars 4 sandwich the plurality of battery cells 2 from a direction perpendicular to the arrangement direction. In addition, a pair of end plates 3 is joined with the binding bars 4 by a method such as riveting, welding, or bolt fastening. It is extremely dangerous to directly couple the battery cells 2 at both ends of the battery pack 1 to the binding bars 4, and therefore the end plates 3 are used. A metal material such as aluminum or iron is often used for the end plates 3. In this case, measures are taken such as sandwiching an insulating material between the end plate 3, and the battery cell 2 at either end. Since the battery cell 2 expands in the course of repeating charging and discharging, a metallic material resistant to tensile force such as high tensile steel is used for the binding bars 4.

In addition, on the upper surface of the battery cell 2, electrode terminals 6 for taking out electricity are provided, and the electrode terminals 6 of adjacent battery cells 2 are connected to each other via the bus bars 5.

Furthermore, in the battery pack 1 according to the first embodiment, as shown in FIG. 1C (a), an insulator 7 having an initial thickness thicker than a gap between the battery cell 2 and the binding bar 4 is provided in the gap. The insulator 7 is made of, for example, rubber or resin material, and the original thickness (initial thickness) is larger than the gap dimension. When assembled as the battery pack 1, as shown in FIG. 1C (b), the insulator 7 is sandwiched in a compressed state in the gap.

It should be noted that as shown in FIG. 1B (a), even in the case where the insulator 7 is substantially the same thickness as the gap, when assembled as the battery pack 1, as shown in FIG. 1B (b), the insulator 7 is inserted in the gap without a change in thickness.

<When a Large External Force is Applied in the Arrangement Direction>

In the conventional battery pack 1 as in WO 2014/034106, when a large external force is applied in the arrangement direction, a large peeling force is likely to occur at the welded portion between the electrode terminal 6 and the bus bar 5. This is because there is nothing other than the end plate 3 to constrain the displacement of the battery cells 2 in the arrangement direction, and the battery cells 2 are likely to move in this direction. On the other hand, since the binding bar 4 constrains displacement of the cells, it is considered that it is difficult for the cells to move in directions other than the arrangement direction and the displacement is controlled to be small.

Figure 2B:
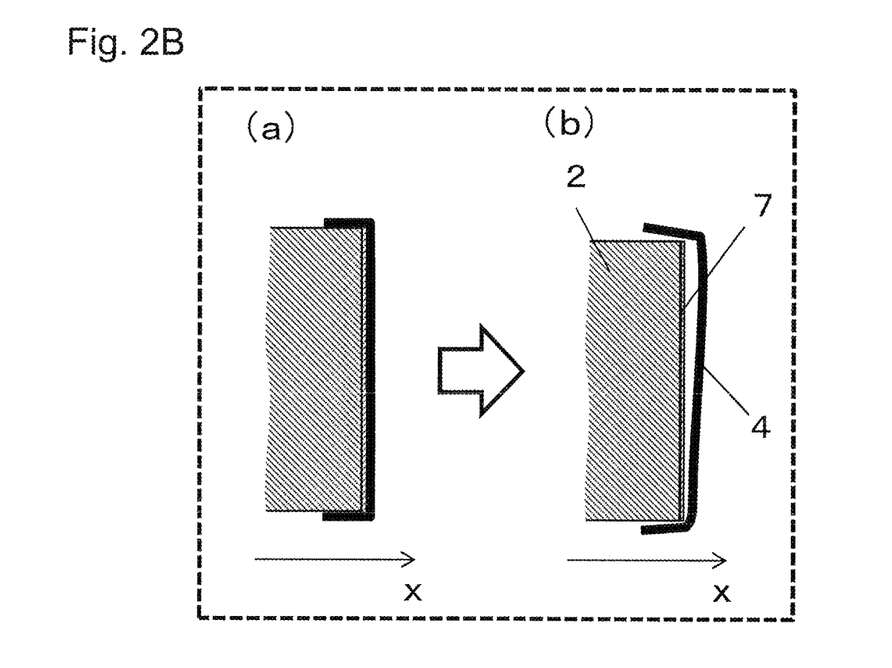
FIG. 2B shows a schematic cross-sectional view (a) showing a cross-sectional configuration of a battery pack sandwiching a thin insulator, having an initial thickness same as that of a gap between the battery cell and the binding bar, in the gap as in FIG. 1B (b), and a schematic cross-sectional view (b) showing the deformation of the binding bar when receiving an impact in the arrangement direction to the battery pack in the schematic cross-sectional view (a)
Figure 2C:
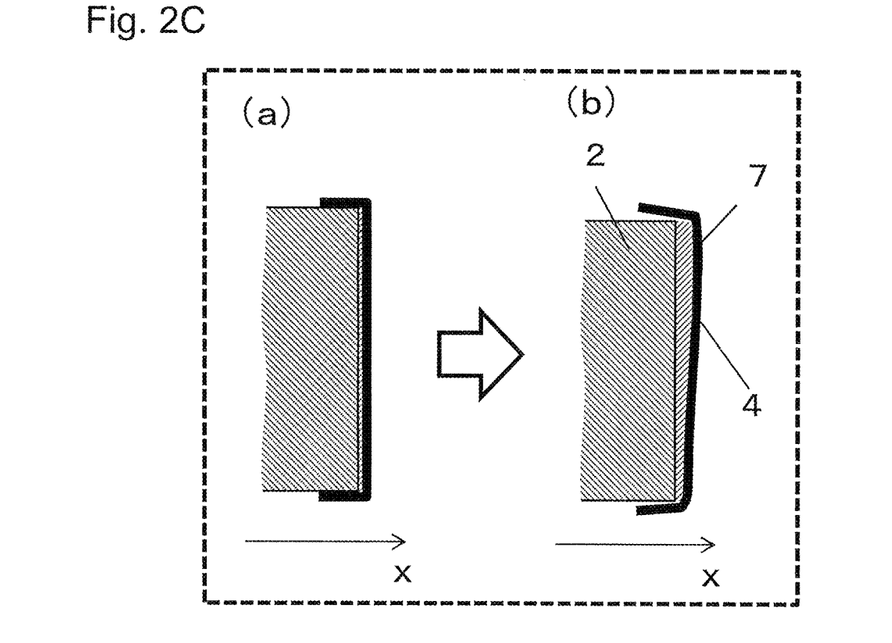
FIG. 2C shows a schematic cross-sectional view (a) showing a cross-sectional configuration of a battery pack sandwiching an insulator, having an initial thickness larger than that of a gap between the battery cell and the binding bar, in the gap as in FIG. 1C (b), and a schematic cross-sectional view (b) showing the deformation of the binding bar and the restoration of the insulator when receiving an impact in the arrangement direction to the battery pack in the schematic cross-sectional view (a)

FIG. 2A (a) is a diagram showing the movement of members when the battery pack 1 in the first embodiment receives an impact 11 in the arrangement direction, and FIG. 2A (b) is a schematic view showing a state in which each battery cell is compressed in the arrangement direction by the impact 11 in the arrangement direction in FIG. 2A (a). FIG. 2B (a) is a schematic cross-sectional view showing a cross-sectional configuration of a battery pack sandwiching a thin insulator 7, having an initial thickness that is the same as a gap between the battery cell 2 and the binding bar 4. FIG. 2B (b) is a schematic cross-sectional view showing the deformation of the binding bar 4 when an impact in the arrangement direction is applied to the battery pack in FIG. 2B (a). FIG. 2C (a) is a schematic cross-sectional view showing a cross-sectional configuration of a battery pack sandwiching an insulator 7, having an initial thickness larger than that of a gap between the battery cell 2 and the binding bar 4. FIG. 2C (b) is a schematic cross-sectional view showing the deformation of the binding bar 4 and the restoration of the insulator 7 when an impact in the arrangement direction is applied to the battery pack in FIG. 2C (a). It should be noted that FIGS. 2B (a), 2B (b), 2C (a), and 2C (b) are cross-sectional views taken along line A-A' in FIG. 1A similarly to FIGS. 1B (a), 1B (b), 1C (a), and 1C (b).

When receiving a large impact 11 in the arrangement direction (y direction), the battery pack 1 deforms as shown in FIGS. 2A (a) to 2C (b). That is, as shown in FIGS. 2A (a) and 2A (b), each battery cell 2 gathers forward in the impact direction (y direction) to be compressed. In addition, as shown in FIGS. 2B (b) and 2C (b), the binding bar 4 is deforms outwardly, so as to protrude in the x direction of the battery pack 1.

First, when the thickness of the insulator 7 is thin, as shown in FIG. 2B (b), the space between the battery cell 2 and the insulator 7 and between the insulator 7 and the binding bar 4 is widened, so that the contact between the insulator 7 and the binding bar 4 cannot be maintained. Thus, the frictional force by the insulator 7 does not work and displacement of the battery cells 2 in the arrangement direction (y direction) cannot be prevented.

On the other hand, as shown in FIG. 1C (a), the first embodiment is characterized in that the insulator 7 in the gap between the battery cell 2 and the binding bar 4 is thicker than the space between the two, and the insulator is sandwiched and compressed between the two when the battery pack 1 is assembled. As the material of the insulator 7, for example, rubber or a resin material having a high critical compressibility ratio can be used. With this structure, even in the case of receiving a large impact in the arrangement direction, even when the space between the battery cell 2 and the binding bar 4 is expanded, as shown in FIG. 2C (b), the compressed insulator 7 expands so that the gap is always filled with the insulator 7. Thus, the battery cell 2 and the insulator 7, and the insulator 7 and the binding bar 4 can keep contact with each other, and frictional force acting between these objects can prevent the displacement of the battery cells 2 in the arrangement direction.

It should be noted that when the mounting surface of the electrode terminal 6 of the battery cell 2 is set on the upper side, that is, on the vertical upper side (z direction), the initial thickness of the insulator 7 may be increased toward the upper side. Setting the initial thickness of the insulator 7 in this way efficiently causes the friction force to act and can prevent displacement of the battery cells 2 in the arrangement direction even at the upper portion where the gap is particularly likely to spread.

Example

In order for the effect of the present disclosure to be confirmed, a simulation as an example was performed.

Figure 3:
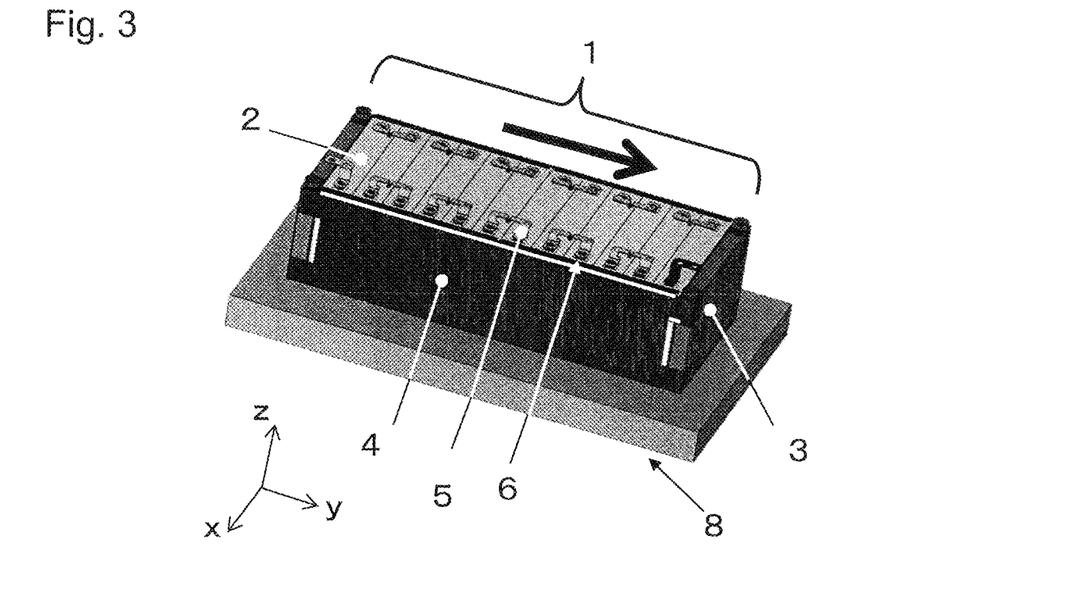
FIG. 3 is a model diagram of a simulation according to the first embodiment of the present disclosure.

FIG. 3 is a model diagram of the battery pack 1 used for the simulation and the jig 8 for fixing the battery pack 1. In this model, it is assumed that the battery pack 1 is mounted in a vehicle such as an electric vehicle, or for stationary use. The battery pack 1 is fastened to the jig 8 at its four corners with bolts, and the jig 8 has a structure in which the bottom surface is completely fixed. An impact of 80 G is applied in the arrangement direction to the battery pack 1 in this state.

Figure 4:
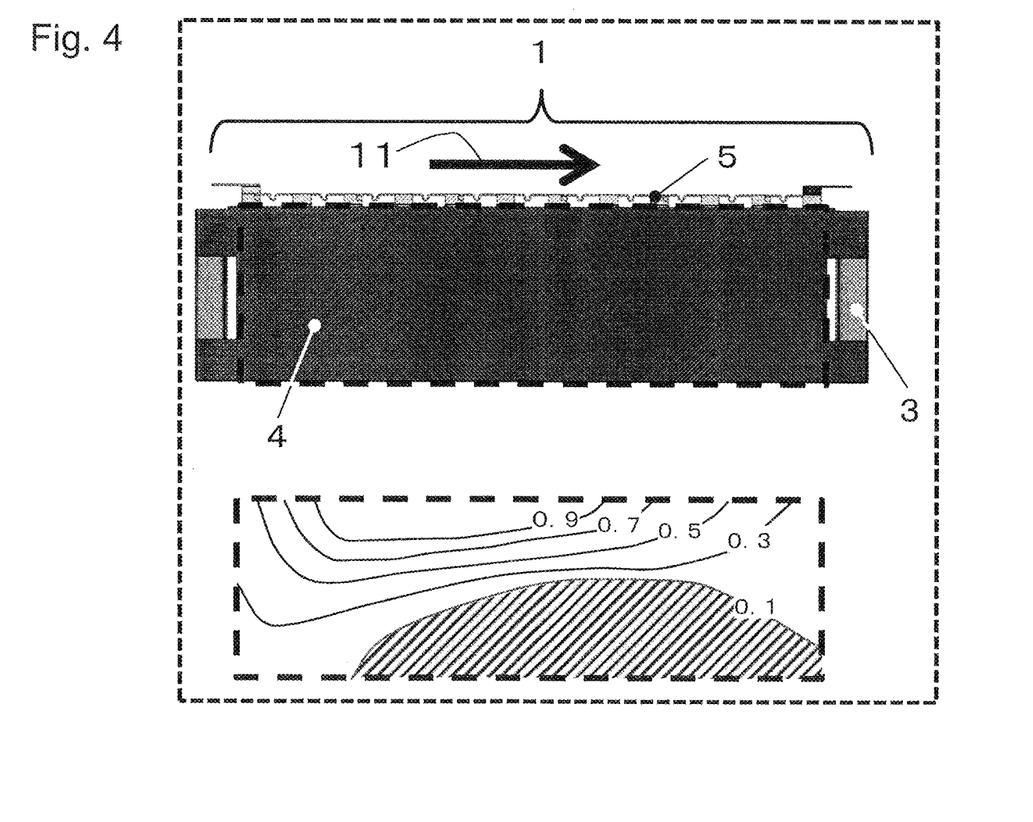
FIG. 4 is a contour diagram showing a gap between the binding bar and the battery cell obtained by the simulation according to the first embodiment of the present disclosure.

In the battery pack 1 shown in FIG. 4, the gap between the side surface of the battery cell 2 and the binding bar 4 is set to be 0.1 mm. The insulator 7 in the gap between the battery cell 2 and the binding bar 4 uses a resin having a Young's modulus of 2.45 GPa, and has an initial thicknesses of 0.1 mm, which is the same as the gap, 0.105 mm, 0.12 mm, 0.14 mm, 0.16 mm, and 0.18 mm. Each of the five initial thicknesses of 0.105 mm to 0.18 mm is sandwiched between the battery cell 2 and the binding bar 4 when the battery pack 1 is assembled, and the thickness immediately after being assembled is 0.1 mm. Contact and friction are taken into consideration between each member, and the friction coefficient between the insulator 7 and the battery cell 2 and between the insulator 7 and the binding bar 4 was varied between 0.2 and 0.8. The friction coefficient in the actual machine can be measured by the test method defined in JIS standard JIS K7125.

For this model, boundary conditions are given to the battery pack 1 with the following procedure.

1) The battery cells 2 are slightly inflated and a binding force is applied to the battery cells 2. This corresponds to a reaction force generated when the battery cells 2 and the end plates 3 arranged in series are compressed and then the end plates at both ends are fixed with the binding bars at the time of assembling the battery pack 1.

2) In order to simulate that the bus bar 5 is arranged at a predetermined position and welded, the displacement in all directions is set to be the same with respect to the corresponding welding surface of the electrode and the bus bar.

3) A screw tightening force for fixing the battery pack 1 to the jig 8 is applied to the bolts at the four corners of the battery pack 1, and the battery pack 1 is fixed to the jig 8.

4) An impact 11 of 80 G is applied in the arrangement direction (y direction), that is, the direction in which the battery cells 2 are arranged in series.

In the following, the effects of the battery pack according to the present disclosure will be described using the simulation results. Here, for the sake of convenience, of the directions perpendicular to the arrangement direction (y direction) of the battery cells 2, the direction perpendicular to the large plane of the binding bar 4 is defined as the x direction.

FIG. 4 is a contour diagram showing a gap between the binding bar and the battery cell obtained by the simulation according to the first embodiment of the present disclosure. FIG. 4 shows contour lines of the gap (displacement difference in the x direction) between the short side surfaces of the battery cells 2 parallel to the large plane of the binding bar 4 and the large plane of the binding bar 4 in the structure of the battery pack 1 having the initial thickness of the insulator 7 of 0.1 mm. In the drawing, the shaded portion where the gap is 0.1 mm or less indicates that the battery cell 2 and the binding bar 4 are in contact via the insulator 7. The portion where the gap is larger than 0.1 mm indicates that a gap is generated between the insulator 7, the battery cell 2, and the binding bar 4; that is, the contact between them is not maintained. The battery pack 1 receives impact in the arrangement direction (y direction) in a state of being fixed to the jig 8 at the four corners, such that a compressive force acts on the battery cells in the arrangement direction (y direction). Thus, a displacement that bulges outward in the x direction occurs. On the other hand, the binding bar 4 also receives a compressive force in the arrangement direction, whereby a large plane bulges outward and a displacement in the x direction occurs. In a portion where the displacement of the binding bar 4 in the x direction is large, a gap is generated, and in a portion where the displacement is small, contact with the binding bar 4 and the insulator 7 is maintained. Since the battery cell 2 and the binding bar 4 are hard to move because the lower side of the battery pack 1 is close to the point fixed to the jig 8, the structure is such that little gap is generated. On the other hand, the more upward the visual point goes, the larger a gap is generated, and a gap is generated in about 45% of the surface where the battery cell 2 and the binding bar 4 are initially in contact. In this region, it is shown that the friction between the battery cell 2, the insulator 7, and the binding bar 4 does not act effectively. It should be noted that in this case, the maximum value of the peeling force generated in the welding portion between the electrode and the bus bar exceeds the allowable value as shown in FIG. 5A.

Based on the results shown in FIG. 4, when the initial thickness of the insulator 7 is made larger than 0.1 mm (the compressibility ratio is made larger than 0), it is thought to be possible to make friction act effectively even in the above region.

Figure 5A:
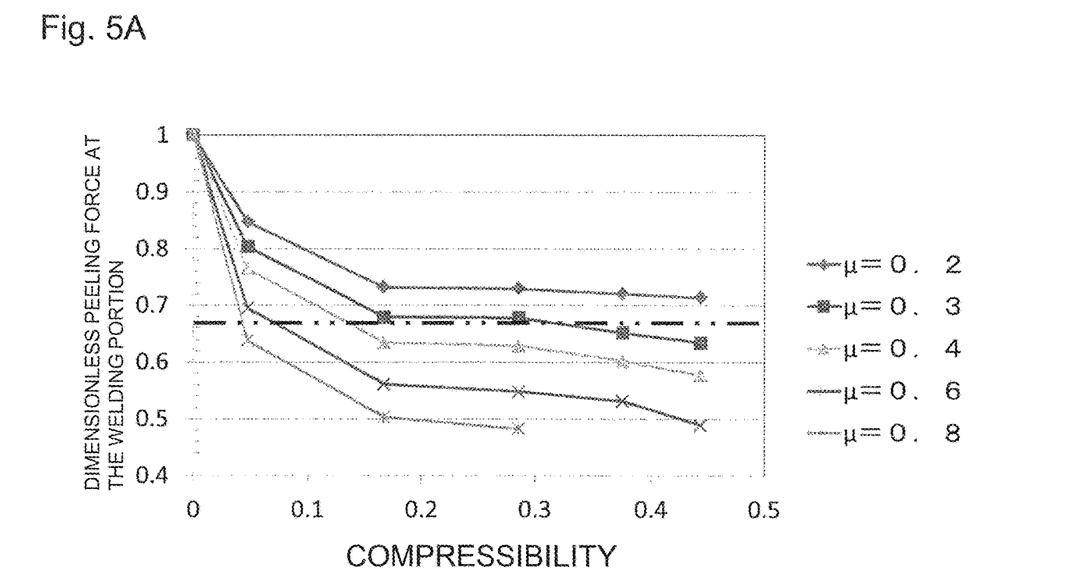
FIG. 5A is a diagram showing the relationship between the peeling force applied to the welding portion of the electrode and the bus bar and the compressibility ratio of the insulator obtained by the simulation according to the first embodiment of the present disclosure.
Figure 5B:
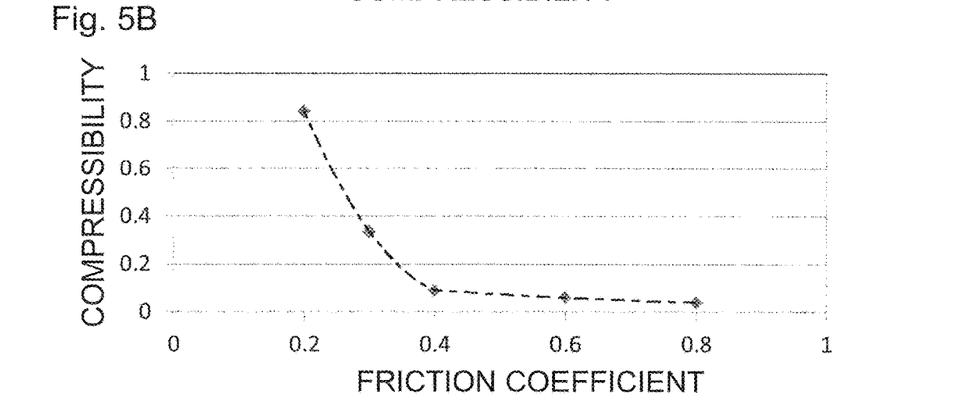
FIG. 5B is a diagram showing the relationship between the friction coefficient and the compressibility ratio of the insulator.

FIG. 5A is a diagram showing the relationship between the peeling force applied to the welding portion of the electrode and the bus bar and the compressibility ratio of the insulator obtained by the simulation according to the first embodiment of the present disclosure. FIG. 5B is a diagram showing the relationship between the friction coefficient and the compressibility ratio of the insulator. FIG. 5A is a graph showing the relationship between the compressibility and the calculated maximum value of the peeling force generated at the welded portion between the electrode and the bus bar when the initial thickness is 0.105 mm to 0.18 mm. Here, the horizontal axis is the compressibility ratio of the insulator and is defined as follows.

Compressibility ratio of insulator=(initial thickness of insulator−initial gap between battery cell and binding bar)/initial thickness of insulator=1−(initial gap between battery cell and binding bar/initial thickness of insulator).

That is, the compressibility ratios of 0.048, 0.167, 0.286, 0.375, and 0.444 respectively correspond to the initial thicknesses of the insulator 7 of 0.105 mm, 0.12 mm, 0.14 mm, 0.16 mm, and 0.18 mm. It should be noted that when the initial thickness is 0.1 mm, the compressibility ratio is zero. In addition, the maximum peeling force of the welding portion shown on the vertical axis in FIG. 5A is indicated by the dimensionless peeling force at the welding portion representing a ratio to a value set to be 1 when the initial thickness of the insulator 7 is 0.1 mm. FIG. 5A shows that as the compressibility ratio increases, the maximum peeling force of the welding portion decreases, friction works effectively via the compressed insulator 7, and the displacement of the battery cells 2 due to impact is prevented.

When dimensionless peeling force at the welding portion shown in FIG. 5A is used as an index, the design allowable value is less than 0.67 indicated by the dotted line in FIG. 5A. At an initial thickness of 0.1 mm of this insulator, this value was 1 and exceeded the allowable value, but for example, in the case of a friction coefficient of 0.4, setting the compressibility ratio to 0.09 or more allows this value to fall below the allowable value. Therefore, this is the compressibility ratio required for the insulator 7. In addition, in the case of the friction coefficient of 0.2, even if the compressibility ratio is increased, the dimensionless peeling force at the welding portion does not fall below the allowable value, so that it can be seen that the friction coefficient has to be larger than 0.2. In this manner, from FIG. 5A, obtaining the compressibility ratio at which the dimensionless peeling force at the welding portion is less than 0.67 for each friction coefficient allows the relationship between the two to be represented by the graph shown in FIG. 5B. It is understood that in the region on the upper side of the graph shown in FIG. 5B, the maximum peeling force of the welding portion can be reduced to the allowable value or less, and for that purpose, assuming that the friction coefficient is $\mu$ and the compressibility ratio is $\Delta L$, the range satisfying the following equations only has to be satisfied.

If $0.2<\mu<0.4$, then $\Delta L>13\mu^2-11.55\mu+2.63$

If $0.4\leq\mu$, then $\Delta L>0.125\mu^2-0.275\mu+0.18$

For the insulator 7, materials and initial dimensions only have to be selected so as to satisfy the above equations. Rubber or a resin is suitable for the material, and since flame resistance is required when used in the battery pack, the material is desirably chloroprene rubber, nitrile rubber, styrene-butadiene rubber, ethylene propylene dien monomer (EPDM), polytetrafluoroethylene (PTFE), polyurethane, polyethylene, polycarbonate, polybutylene terephthalate (PBT), modified polyphenylene ether (PPE), and the like. With these materials, the friction coefficient with the can of the battery cell 2, which is a metal material, and the binding bar 4 is often larger than 0.4, and the compressibility rate is sufficient if greater than 0.1 (10%). Even materials other than the above can be used as long as the above equations are satisfied, but since many rubbers and resins often have critical compressibility ratios lower than 40%, the friction coefficient is desirably 0.3 or more. In addition, as can be seen from the graph in FIG. 5A, when the friction coefficient is 0.2, the dimensionless peeling force is not smaller than the allowable value, and also from this point, the friction coefficient is desirably 0.3 or more.

Second Embodiment

In the first embodiment, the structure in which the insulator 7 to be compressed between the battery cell 2 and the binding bar 4 is adopted, but the battery pack according to the second embodiment is different in that a structure in which the insulator 7 is adhered to any one or to both of the binding bar 4 and the battery cell 2 when the battery pack 1 is assembled is adopted. Since the insulator 7 is adhered to at least one of the binding bar 4 and the battery cell 2, the displacement of the battery cells 2 upon receiving an impact in the arrangement direction is even smaller than the displacement in the case of the first embodiment in which only friction works. Therefore, it is possible to further reduce the load on the welding portion acting between the electrode terminal 6 and the bus bar 5.

It should be noted that if the outer surface of the battery cell 2 is made of a metal material or the binding bar 4 is made of a metal material, roughening the surface allows the friction coefficient to be increased, and a greater effect can be obtained than the effect of the method described in the first embodiment. For example, in the case of a steel material often used as a material of the binding bar 4, the friction coefficient is about 0.4 if the average roughness Ra is 5 to 10 µm. If the average roughness is larger than 10 µm, it is possible to increase the friction coefficient up to a certain value, but when the contact area on the outermost surface of the members becomes smaller, the effect of friction may be reduced when the battery pack 1 receives an impact and the distance between the battery cell 2, the insulator 7, and the binding bar 4 increases.

It should be noted that the present disclosure includes any combinations of embodiments and/or examples as appropriate out of the various embodiments and/or examples described above, and effects possessed by the respective embodiments and/or examples can be exhibited.

The battery pack of the present disclosure can also be applied to transportation equipment such as electric vehicles and hybrid cars, household storage batteries, emergency storage power supplies, and the like.

What is claimed is:

1. A battery pack comprising:
   a plurality of battery cells arranged in a line in one direction as an arrangement direction, wherein adjacent battery cells of the plurality of battery cells are connected to each other via a bus bar on upper surfaces of the plurality of the battery cells;
   a pair of end plates configured to sandwich the plurality of battery cells from both ends of the plurality of battery cells in the arrangement direction of the plurality of battery cells;
   a pair of binding bars configured to sandwich the plurality of battery cells from a direction perpendicular to the arrangement direction and to fasten the pair of end plates at both ends in the arrangement direction; and
   an insulator sandwiched in a gap between each of the binding bars and the plurality of battery cells,
   the insulator having an initial thickness larger than a thickness of the gap before insertion into the gap in a compressed state,
   each of the binding bars being in contact with a first surface of the insulator,
   side surfaces of the battery cells being in contact with a second surface of the insulator, which is an opposite surface relative to the first surface of the insulator, and
   each of the binding bars has first and second bent ends that confront and are in direct contact with upper surfaces and lower surfaces of the battery cells, respectively.

2. The battery pack according to claim 1, wherein
   assuming that a friction coefficient between the battery cells and a corresponding one of the binding bars, and the insulator is µ, and a compressibility ratio of the insulator is ΔL, a following relationship is satisfied,
   if $0.2 < \mu < 0.4$, then $\Delta L > 13\mu^2 - 11.55\mu + 2.63$, and
   if $0.4 \leq \mu$, then $\Delta L > 0.125\mu^2 - 0.275\mu + 0.18$.

3. The battery pack according to claim 1, wherein the insulator is adhered to at least one of a corresponding one of the binding bars and the battery cells.

4. The battery pack according to claim 1, wherein when a mounting surface of an electrode of the battery cells is set to be an upper side, the initial thickness of the insulator becomes larger toward the upper side.

5. The battery pack according to claim 1, wherein the insulator is provided on an entire side surface of the battery cells.

6. The battery pack according to claim 1, wherein the insulator is provided on an entire side surface of the battery cells, and the first and second bent ends of each of the binding bars are bent at a right angle at each end thereof.

7. The battery pack according claim 2, wherein the insulator is provided on an entire side surface of the battery cells, and the first and second bent ends of each of the binding bars are bent at a right angle at each end thereof.

8. The battery pack according to claim 1, wherein each of the binding bars is formed of a metal material, and a surface of each of the binding bars, which faces the insulator, is roughened.

* * * * *